Aug. 17, 1926.
E. C. BUSCH
1,596,801
CULTIVATOR SHOVEL ATTACHING MEANS
Filed Nov. 18, 1925
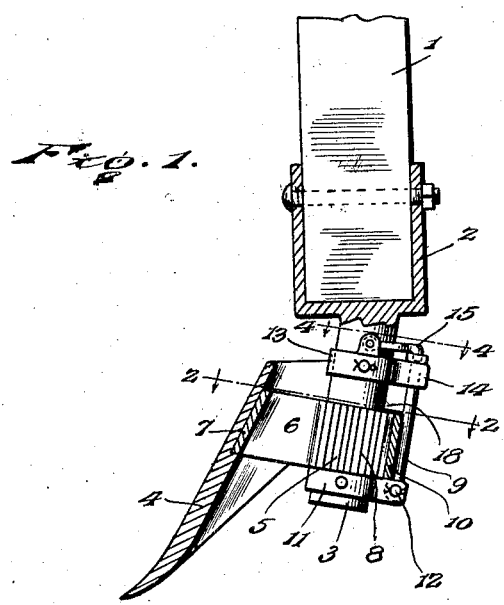
Fig. 1.
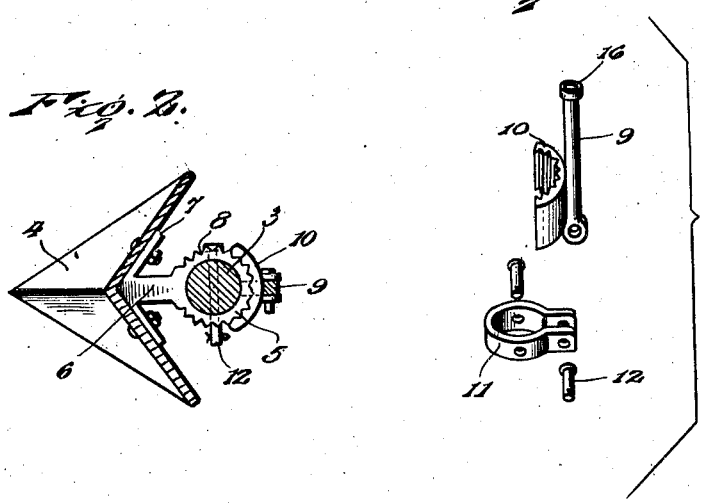
Fig. 2.
Fig. 3.
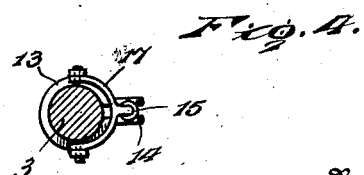
Fig. 4.
Inventor
E. C. Busch.
By Lacy Lacey, Attorneys Patented Aug. 17, 1926.

1,596,801

UNITED STATES PATENT OFFICE.

EDWARD C. BUSCH, OF BELLEPLAINE, MINNESOTA.

CULTIVATOR-SHOVEL ATTACHING MEANS.

Application filed November 18, 1925. Serial No. 69,834.

The invention relates to a shovel blade attaching means, whereby the blade may be angularly adjusted to meet requirements of soil, work and other conditions and made secure in the adjusted position.

The invention consists of a novel mounting for the shovel blade and fastening means associated therewith for securing the blade in the required position, said fastening means being easily operable and not liable to interfere with the working of the blade.

While the drawings illustrate a preferred embodiment of the invention it is to be understood that in adapting the means to meet specific needs and requirements the design may be varied, and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is an elevational view, partly in section, of a cultivator shovel and a mount and fastening means therefor, embodying the invention, Figure 2 is a horizontal sectional view on the line 2—2 of Figure 1, Figure 3 is a detail perspective view of the latch, and supporting means therefor, the several parts being separated and disposed in a group, and Figure 4 is a horizontal sectional view on the line 4—4 of Figure 1.

Corresponding and like parts are referred to in the following description and designated in the several views of the drawings by like reference characters.

The numeral 1 designates a standard such as generally provided for receiving a cultivator shovel or like part. A socket 2 is fitted to the lower end of the standard 1 and has a depending stem 3 which is slightly inclined and of cylindrical form to admit of the shovel blade 4 being angularly adjusted thereon. These parts may be of any preferred construction.

A sleeve 5 is bolted or otherwise secured to the shovel blade 4 and is of an internal diameter to snugly receive the stem 3 upon which it is mounted for horizontal angular adjustment. A shank 6 forming a part of the sleeve 5 projects laterally therefrom and has lateral flanges 7 at its outer, or forward, end to which the shovel blade 4 is attached. The outer side of the sleeve 5 is formed with teeth, or corrugations 8, which are adapted to coact with the latch mounted upon the stem 3, whereby to secure the blade 4 in the required adjusted position.

The latch consists of a bar 9 and a toothed element 10, the latter coacting with the teeth 8 of the sleeve 5 to hold the blade 4 in the located position. A clamp 11 is mounted upon and secured to the lower end of the stem 3 and constitutes a stop, to limit the downward movement of the sleeve 5 and the shovel blade 4 and also provides means for receiving the latch which is pivoted thereto, as indicated at 12, the pivot fastening consisting of a bolt passing through registering openings formed in the stem 3 and clamp 11. The part 10 consists of a cross-piece which is transversely curved and toothed upon the concave side to match the teeth 8 to interengage therewith and form locking means to hold the shovel blade in the desired position. A guide 13, similar in formation to the part 11, is secured to the stem 3 above the sleeve 5 and the spaced off standing portions 14 thereof receive between them the upper end of the bar 9, thereby preventing lateral displacement thereof. A suitable fastening, such as a hook 15, is pivoted to the guide 13 and is adapted to engage an opening 16 formed in the upper end of the bar 9, whereby to hold the latch in operative position, as indicated most clearly in Figure 1. The hook 15 includes a fork 17 which embraces the stem 3 and is pivoted to lugs of the guide 13.

When it is required to angularly adjust the shovel blade 4 either to the right or to the left, the latch is released from the fastening 16 and is moved outward at its upper end to cause the toothed portion 10 to clear the teeth of the sleeve 5, after which the shovel blade may be turned upon the stem 3 to the desired position and is made secure by restoring the latch and cooperating fastening to normal position, as indicated in Figure 1. A suitable stop 18 on the stem 3 limits the upward movement of the sleeve 5, the latter being confined between the parts 18 and 11 which, as stated, constitute stops to prevent vertical movement of the shovel blade.

Having thus described the invention, I claim:

1. In combination, a standard provided with a stem, a shovel, an exteriorly toothed sleeve mounted upon the stem supporting said shovel, a latch pivoted at one end to the stem and having a toothed portion to engage the teeth of the sleeve, and fastening means on the stem to engage the latch and hold it in operative position.

2. A standard provided with a stem, a shovel having a toothed sleeve mounted upon the stem, a clamp on the stem providing a stop, a latch pivoted to the clamp, a guide on the stem to coact with the upper end of the latch, and a fastening connected to the guide and adapted to engage and hold the latch in operative position.

In testimony whereof I affix my signature.

EDWARD C. BUSCH. [L. S.]